DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 19, 1970

874 O.G. 697

T874,005
APPARATUS FOR APPLYING PLASTICIZER TO FILTER TOW

Theodore C. Fritz and Robert W. Wagner, both of P.O. Box 511, Kingsport, Tenn. 37662

Filed Aug. 12, 1968, Ser. No. 752,052
Int. Cl. B05c *5/00, 11/16*
U.S. Cl. 118—7
1 Sheet Drawing. 10 Pages Specification

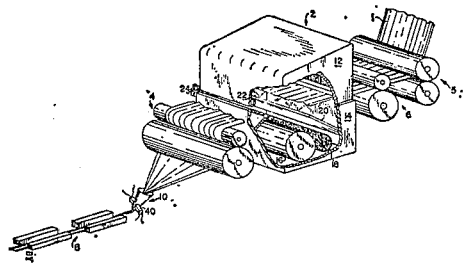

Apparatus for making tobacco smoke filters including a plasticizer applicator located within a spray enclosure. The applicator includes a rotatably mounted brush roll positioned adjacent a dip roll which is partially immersed in liquid in the bottom of the enclosure. The rotating brush roll flings the liquid carried by the dip roll onto filamentary tow passing through openings in the side of the enclosure.

May 19, 1970 T. C. FRITZ ETAL T874,005
APPARATUS FOR APPLYING PLASTICIZER TO FILTER TOW
Filed Aug. 12, 1968
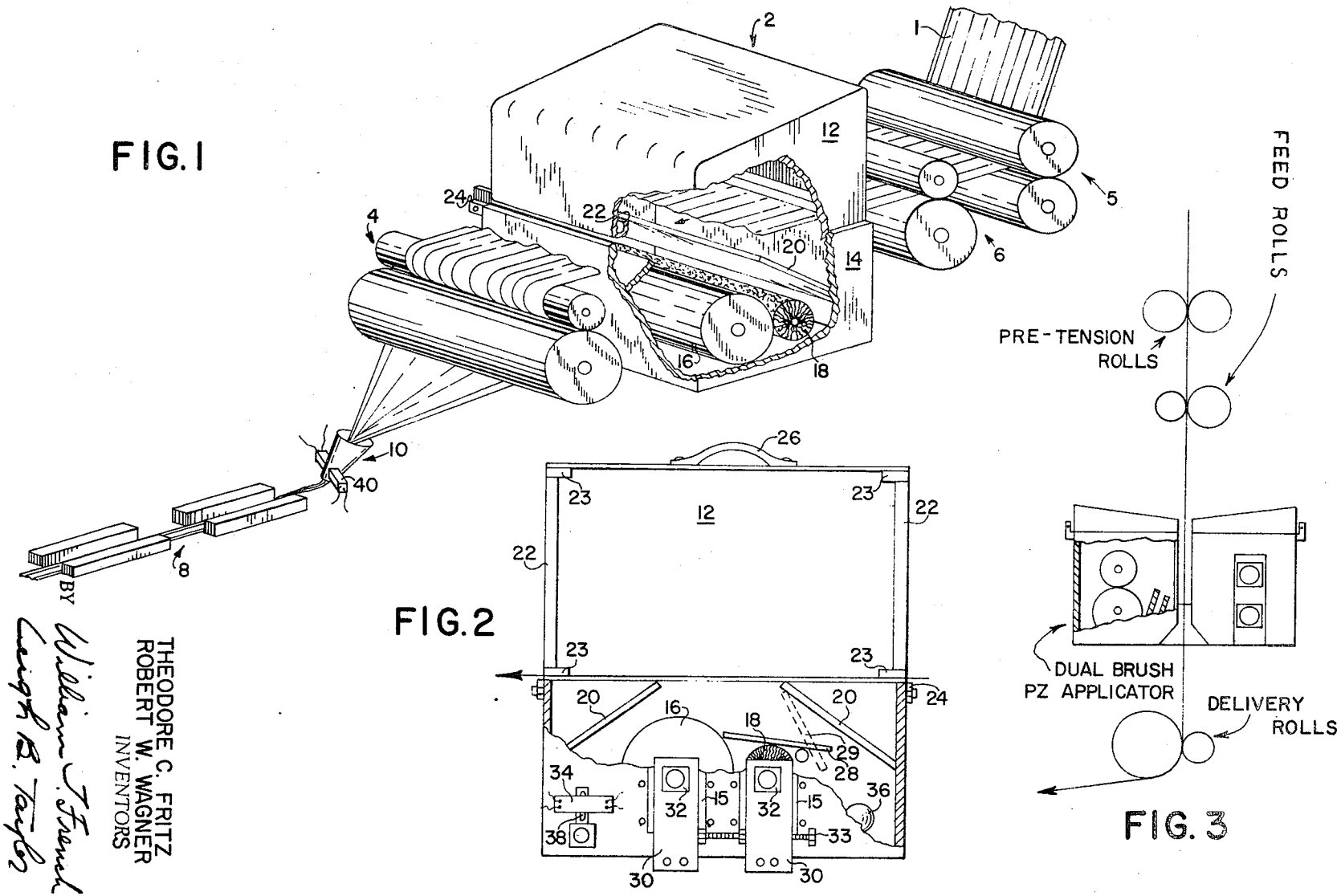
THEODORE C. FRITZ
ROBERT W. WAGNER
INVENTORS
BY William T. French
Leigh B. Taylor
ATTORNEYS